United States Patent

[11] 3,588,375

[72] Inventor Carl L. Martin
Newport Beach, Calif.
[21] Appl. No. 4,176
[22] Filed Jan. 14, 1970
[45] Patented June 28, 1971
[73] Assignee Leach Corporation
South Pasadena, Calif.
Continuation of application Ser. No. 622,717, Mar. 13, 1967, now abandoned.

[56] References Cited

UNITED STATES PATENTS

| | | | |
|---|---|---|---|
| 2,521,623 | 9/1950 | Arndt, Jr. et al. | 179/100.2 |
| 2,819,348 | 1/1958 | Bogert | 179/100.2 |
| 3,369,082 | 2/1968 | Hibbard | 179/100.2 |

OTHER REFERENCES

ELEMENTS OF MAGNETIC TAPE RECORDING by N. M. Haynes 1957 by Prentice-Hall, Inc. Englewood Cliffs, N.J. Pages 147, 149 & 347

*Primary Examiner*—J. Russell Goudeau
*Attorney*—Jackson and Jones

[54] MULTI-CHANNEL TAPE RECORDER WITH DOUBLE RECORDING PREVENTION MEANS
6 Claims, 3 Drawing Figs.

[52] U.S. Cl. 179/100.2, 179/100.1
[51] Int. Cl. G11b 15/04, G11b 27/36
[50] Field of Search 179/100.1 (VC), 100.2 (B), 100.2 (D), 100.2 (K), 100.2 (MI)

ABSTRACT: Tape recorder for two or more recording channels having a multitrack read-write recording head, volume controls for varying the intensity of the electric recording and reproducing signals, visible indicators for indicating the magnitude of such signals, and a read head for monitoring the recorded information immediately after it has been recorded. A selector switch permits the alternative replay of all channels individually or simultaneously. The recorder has provision to positively prevent the read-write recording head from recording any information if the tape has information already recorded thereon.

PATENTED JUN 28 1971 3,588,375

INVENTOR
CARL L. MARTIN
BY Christie, Parker & Hale
ATTORNEYS

MULTI-CHANNEL TAPE RECORDER WITH DOUBLE RECORDING PREVENTION MEANS cl CROSS REFERENCE TO RELATED APPLICATION

This application is a continuation of application Ser. No. 622,717 filed Mar. 13, 1967, now abandoned.

BACKGROUND OF THE INVENTION

Today tape recorders are widely used to store and reproduce information. Generally, these recorders record one track on the tape from a single channel, such as a microphone. More recently, multi channel tape recorders have been introduced for use in conferences, courtrooms, and other occasions where two or more people talk and where it is desirable to have each person or group of persons recorded on an individual track on the tape. These recorders utilize a plurality of microphones of a limited effective range such that words spoken by one person are received by one microphone. The tape recorder records a plurality of tracks on a magnetic tape, each track corresponding to a particular microphone. It is thus possible to record and replay these tracks individually or simultaneously, which greatly aids in transcribing the information contained on the tape.

The presently available multi channel tape recorders have several shortcomings that reduce their effectiveness and usefulness. In the past, a person supervising the recording was unable to determine the magnitude of the electric signals recorded on the magnetic tape. The heretofore available recorders only indicated whether any signals were recorded at all but not whether or not they were of a sufficient magnitude. It is a great importance to know the magnitude of the recorded signals and adjust the recorder if necessary, since in conversations such as conferences or in a courtroom, for example, a person ordinarily does not talk into the microphone but talks to the people in the room. The speaker is frequently relatively far removed from the microphone, resulting in weak signals which make the information stored on the tape hard or impossible to read, unless the apparatus is adjusted to suitably amplify the signals.

In the past, the reproducing portion of these recorders were unable to provide the transcribing person with a full selection of channel and volume controls. This necessitated frequent replay of tape to enable the production of an accurate transcript. These replays were time-consuming and economically wasteful.

Lastly, the person supervising the recording often has to do so over extended periods of time. Several rolls of magnetic tape must be used to cover the whole time span of most trials, depositions, or other conferences. Since it is impossible to visibly detect whether or not a particular tape has already been used, and since tape rolls are usually stored closely together adjacent the recording machine, there is a definite possibility that one or more tapes may be exposed to the magnetic recording head twice. Frequent replays of just recorder material raises the danger that it continues the recording on a portion of the tape containing information recorded during the session and not yet transcribed. This double exposure makes the recorded information of each exposure useless and results in a loss of information which in most instances can never again be repeated. Some tape recorders utilize an erasing head before the tape is passed by the recording head. The inherent danger of a recording-erase machine is that the original information contained on the tape may be erased before it has been transcribed.

SUMMARY OF THE INVENTION

A multichannel tape recorder constructed according to this invention includes a volume control to vary the magnitude of the electric signals transmitted to the recording head. The magnitude of the signals is constantly monitored and visibly indicated by a lamp, for example. The operator supervising the recording is therefore in a position to see whether or not the information recorded on the tape is supplied by electric signals of a sufficient magnitude. Should the magnitude fall below a minimum, the operator is alerted by the decreased intensity of the light and can adjust the volume control immediately. Preferably, the indicator is a light source that increases in its intensity linearly relative to the intensity of the electric signals.

A read head is disposed adjacent the magnetic recording head such that tape transported past the recording head first passes the read head. If any information is contained on the tape approaching the recording head, it is sensed by the read, it is sensed by the read head and electric signals emitted by the head are employed to trigger a relay whereby the recording head is deenergized, thus assuring that no new information is recorded on previously stored information. Preferably, the electric relay is connected to audible and visible warning devices such that the operator supervising the recording is alerted that no recording should take place and that the tape used in the apparatus already has information recorded thereon.

To further aid the operator is supervising the recording and in detecting any malfunctioning, a second multitrack read head is disposed adjacent the recording head such that the tape passes the second read head after information has been recorded thereon by the apparatus. The operator can thus monitor the recording that is being made and can detect any otherwise undetectable failure that might have occurred within the recording system.

To aid the person transcribing the information stored on the tape, a selector switch is provided that enables the playback of an individual channel or of all channels simultaneously. Additionally, multiple volume control enhances the ease with which the information is transcribed and insures maximum efficiency. The arrangement enables the transcribing person to vary the volume of the multichannel audio signals emitted by the electroacoustic transducer individually and simultaneously. Thus, should the combined level of all of the reproduced channels be too low, a single volume control can be used to conveniently increase the combined level. If, on the other hand, the sound level from a particular channel is out of audio balance, i.e. either too higher or too low relative to the sound level from the other channels, the volume level of that particular channel can be selectively adjusted on an individual basis to obtain a clear playback. This combination of controls is a great importance and help, and substantially eliminates the danger that the transcribing person misses a channel because of its low volume, which in the past could not be adjusted without simultaneously increasing the volume, and therefore the background noise of all other channels, to the point that the low volume channel becomes unclear.

DESCRIPTION OF THE PREFERRED EMBODIMENT

Figures 1, 2, 3:
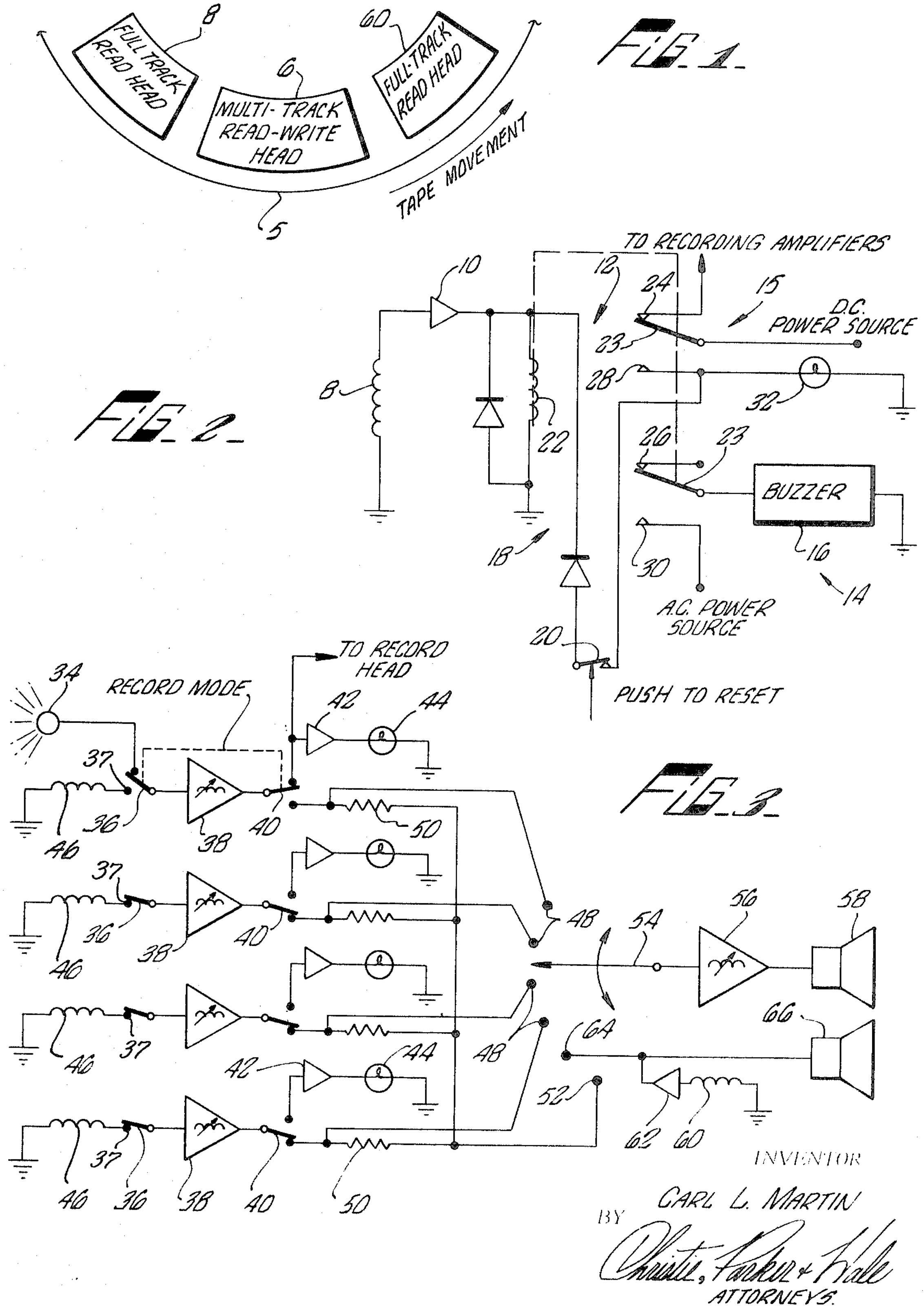
FIG. 1 is a schematic drawing showing the magnetic tape and the recording heads arranged according to this invention.
FIG. 2 is a schematic drawing of the electric circuit for preventing the recorded thereon.
FIG. 3 is a schematic drawing of the electric circuit for selectively replaying one or more channels and including variable indicators for presenting, in a visual form, the intensity of signals being recorded during a record mode.

FIG. 2 shows the electric circuit employed for detecting whether or not magnetic tape 5 about to be transported past a read-write magnetic recording head 6 (shown in FIG 1) contains any information stored thereon during a previous conference, which information must not be destroyed by erasure or double recording. The recording head is constructed to simultaneously record as many tracks on the tape as there are recording channels. In the past, a plurality of recording heads were used, each head recording some of the tracks only. The tracks on the tape were therefore out of phase relative to each other and could not be read with a full track head if it is desired to play back all tracks simultaneously. The use of a full track head affords advantages that can be obtained because all tracks are in phase, as will be pointed out in greater detail below.

A conventional magnetic read head 8 is placed adjacent the read-write head such that tape to be transported past the recording head is first transported past the read head. If any previously stored information whatever is on the magnetic tape, it causes the read head 8 to emit electrical signals that are amplified in an amplifier 10. The amplified signals are transmitted to a conventional relay 12. The relay is shown in a position whereby the recording head 6 is energized and the tape used for recording had been erased and is free of prerecorded information. A normally open first relay circuit 14 includes a fixed contact 30 which is connected to a source of alternating current used for supplying alternating current power to the tape recorder. The first circuit includes a warning device 16 that emits audible signals if the circuit is closed by movement of movable contact 23 to fixed contact 30. Most conveniently, this warning device is a conventional electric buzzer that is actuated by alternating current.

A closed second electric circuit 15 connects a source of direct current through closed contacts 23, 24 to the recording amplifiers when the relay is deenergized in the position shown in FIG. 2.

If magnetic tape transported past the read head 8 contains information stored thereon, the read head emits electric signals that are amplified at 10 and energize an electromagnetic coil 22. The contact blades 23 of the relays are thereby moved from contacts 24 and 26 to contacts 28 and 30, respectively. The first relay circuit is thereby closed and the second relay circuit opened. Buzzer 16 is thus connected to the alternating current source through contacts 23, 30 and in response emits an audible warning signal. Warning lamp 32 draws power from the supply of direct current through contacts 23, 28 and thus emits a visual warning signal. An operator supervising the recording is thereby made aware that the magnetic tape used for recording already contains information recorded thereon. Simultaneously, the recording amplifiers are deenergized and disconnected from their power supply so as to provide assurance that no further information can be recorded on the tape. The recording amplifiers remain deenergized because the coil 22 of the relay continues to be energized by the DC power supply. For the same reason, the audible and visual signals of buzzer 16 and lamp 32 persist until the relay 12 is reset.

To reset the relay, the operator opens switch 20. By opening reset switch 20, the supply of power from contacts 23, 28 and the DC power supply is interrupted, whereby the contact blades of the relay return to their original position provided the tape being transported past the read head 8 no longer contains information recorded thereon. Should the tape continue to have information recorded on it, the amplifier 10 continues to supply the electromagnetic coil 22 of the relay with power such that the contact blades of the relay remain in their triggered position. The recording head 6 then remains disconnected from the supply of DC power and double recording of information on the tape is impossible.

The reset switch 20 is necessary since occasionally the tape contains background noises due to insufficient erasure of the tape. In such instances the background noises are usually of a relatively short duration and it would be impractical to have to change the tape in the apparatus. Thus, if the sensing mechanism is triggered by background noises on the tape, the operator can push switch 20 and the apparatus will continue ro record. If, on the other hand, the tape actually has an information record thereon, read head 8 continuously emits electric signals that are fed into the electromagnetic coil of the relay, and it is impossible for the operator to energize the recording head. Buzzer 16 and lamp 32 continue to emit warning signals and no information can be recorded until the tape in the apparatus has been replaced by new tape. Any possibility to lose information recorded on a tape by exposing it a second time to the recording head is thereby made impossible.

FIG. 3 shows the recording and reading circuits of an apparatus constructed according to this invention and provided with a plurality of recording channels. Describing first the recording mode, attention is directed to the uppermost part of FIG. 3 showing the circuit when the apparatus records. Although each one of the channels is in the same position as the uppermost one shown in FIG. 3, only that one is shown in a recording position in order to clearly demonstrate the combined record and playback features of this invention. It is, of course, understood that all channels are at any given time in a like position for either recording or for playback.

Switches 36 and 40 are actuated to set the apparatus in either a recording or a playback mode. In the uppermost channel of FIG. 3, the switches are in a recording position whereas in all others they are in a playback position. Considering first the upper channel a, record operation may be explained. A microphone 34 receives audio signals which are transformed into electric signals and transmitted past a switch 36, through an amplifier 38 including a level control, past a switch 40, and toward the recording head 6. The intensity of the electric signals transmitted to the recording head is sensed and amplified in a lamp driver amplifier 42 and then fed through a light emitting device 44 varying in its intensity linearly with the change in magnitude of the electric signals fed to the recording head. Preferably, the light emitting device 44 is a conventional incandescent lamp.

During a recording session, the audio signals picked up by the microphone will create a constant fluctuation of the intensity of the light emitted by the incandescent lamp 44. If the intensity of the emitted light becomes weak as when a person speaks and is removed from the microphone, the intensity of the light signals emitted by the lamp 44 decreases and the operator can adjust the level control of the amplifier 38 until a satisfactory light intensity of the incandescent lamp is obtained. The operator is then assured that the information recorded on the tape is sufficiently strong to give excellent reproduction when the apparatus is switched to playback.

Upon playback, switches 36 and 40 are in a position as shown in the lower portions of FIG. 3. The electromagnetic recording head 6 reads the information stored on the magnetic tape through coils 46 and is connected thereto at the terminal point 37. Thus the recording head emits electric signals that are transmitted through the amplifier 38 to pickup points 48 or through resistors 50 to a pickup point 52. A conventional switch 54 is selectively rotated to alternatively contact any one of the pickup points 48 or 52 and to further transmit the electric signals originating at the recording head and amplified in the amplifier 38 toward a power amplifier 56 provided with a master volume control. An electroacoustic transducer or speaker 58 receives the signals from the power amplifier and transforms them into audio signals.

A second electromagnetic reading head 60, reading all tracks recorded on the tape simultaneously, is disposed adjacent head 6, as shown in FIG. 1, such that tape is first transported past the read-write recording head and then past the reading head 60. This full-track reading head emits electric signals in accordance with the information stored on the tape. The electric signals are fed through a preamplifier 62 and onto a pickup point 64 that can be connected with the power amplifier 56 by turning the switch 54 to that pickup point.

A person transcribing the information from the recording tape thus has a number of alternatives to most conveniently and economically accomplish the task. Generally, the selector switch 54 is closed at pickup point 64 such that information from all tracks recorded on the tape is simultaneously transmitted to the speaker 58. To adjust the speaker to the proper volume, the level control of the power amplifier 56 is varied. If a particular channel emits weak signals, as would be the case if the person speaking into the microphone was too far away from it during the recording, and the operator failed to properly adjust the level control in the preamplifier 38 to increase the magnitude of the electric signals recorded, the transcribing person turns switch 54 to connect pickup point 52 with the speaker. Although the audio signals emitted by the speaker still contain all channels recorded on the tape, it is now possible to individually increase any one of the channels to bring the loudness of the weak channel to the level of the others.

If it is desired to transcribe only one particular channel, as for example the testimony of a witness at a trial, the transcribing person selects the particular channel by turning switch 54 to the corresponding pickup point 48. All other channels are thereby eliminated and the audio signal emitted by the speaker is limited to the one channel that had been selected.

By providing the second read head 60 the operator supervising the recordation has an additional tool to assure the proper functioning of the tape recorder. An earphone or other suitable device can be connected with the second reading head such that the operator can monitor what is recorded by the recording head such that the operator can monitor what is recorded by the recording head 6 on tape 5. The monitoring takes place about one-third to one-half second after the information has been recorded on the tape. Any malfunctioning or misreading, including the recording of too weak a signal, is easily detected and can be quickly rectified. Substantial defects in, or losses of, recorded material which is often of prime importance, as in the reporting of court proceedings for example, can thereby be eliminated.

Although FIG. 3 shows four recording channels, it will be understood that any desired number of channels may be utilized to record. Thus, in the presently preferred embodiment of this invention, the magnetic recording head 6 is constructed to simultaneously record six recording tracks on the magnetic tape, each track corresponding to one channel.

I claim:

1. A magnetic tape recorder for recording information provided over a plurality of independent information channels on a preselected number of individual tracks forming a multitrack magnetic tape recording medium and for reproducing such information recorded on said multitrack magnetic tape recording medium, said magnetic tape recorder comprising:

a multitrack recording-reproducing circuit including a plurality of first acoustic transducers each for generating an electrical signal essentially representative of acoustic energy to be recorded which is provided by a single one of a plurality of independent sources of acoustic energy, a multitrack read-write head adapted to either independently apply each of a plurality of electrical signals to be recorded to a separate one of said individual tracks or independently sense recorded electrical signals present on said individual tracks, a second acoustic transducer for converting electrical signals applied thereto to acoustic energy, and read-write control means for selectively connecting each of said plurality of first acoustic transducers to said multitrack read-write head to enable electrical signals generated by respective ones of said first acoustic transducers to be applied to separate ones of said individual tracks or for connecting said multitrack read-write head to said second acoustic transducer to enable recorded electrical signals present on said individual tracks that are sensed by said multitrack read-write head to be converted to acoustic energy;

a recorded signal detection circuit for preventing the destruction of information recorded on said multitrack magnetic tape recording medium, said detection circuit including a first full-track read head, situated adjacent said multitrack read-write head, for sensing the presence of electrical signals recorded on any of said individual tracks, and detection control means, operatively coupled between said first full-track read head and said read-write control means, for preventing said multitrack read-write head from applying electrical signals to be recorded to any of said individual tracks; and a monitor circuit including a second full-track read head, situated adjacent said multitrack read-write head, for selectively enabling electrical signals recorded on any of said individual tracks to be sensed and converted to acoustic energy, whereby successive sections of said multitrack magnetic tape recording medium are sequentially transported past said first full-track read head, said multitrack read-write head, and said second full-track read head.

2 The apparatus defined by claim 1 wherein said read-write control means includes:

a gain control circuit; and means for selectively coupling either said first acoustic transducers or said multitrack read-write head to said gain control circuit.

3 The apparatus defined by claim 1 further including a third acoustic transducer operatively coupled to said second full-track read head for converting recorded electrical signals sensed by said second full-track head to acoustic energy.

4. The apparatus defined by claim 1 wherein said detection control means includes:

visual indicator means for providing an indication that said read-write control means is deenergized;

audible indicator means for providing an indication that said first full-track read head has sensed the presence of recorded electrical signals on any of said individual tracks; and a solenoid operated switch for energizing said audible indicator means, and for deenergizing said read-write control means, in response to said first full-track read head sensing the presence of recorded electrical signals on any of said individual tracks.

5 The apparatus defined by claim 4 wherein said read-write control means includes:

a gain control circuit; and means for selectively coupling either said first acoustic transducers or said multitrack read-write head to said gain control circuit.

6 The apparatus defined by claim 5 further including a third acoustic transducer operatively coupled to said second full-track read head for converting recorded electrical signals sensed by said second full-track head to acoustic energy.